(12) United States Patent
Dayoub et al.

(10) Patent No.: US 9,296,282 B2
(45) Date of Patent: Mar. 29, 2016

(54) OPEN ROOF CONSTRUCTION FOR A VEHICLE

(71) Applicant: Inalfa Roof Systems Group B.V., Venray (NL)

(72) Inventors: Karim Dayoub, Rochester, MI (US); Adam Alexander Bonner, Northville, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/263,163

(22) Filed: Apr. 28, 2014

(65) Prior Publication Data

US 2015/0306941 A1  Oct. 29, 2015

(51) Int. Cl.
*B62D 25/06* (2006.01)
*B60J 7/047* (2006.01)
*B60J 7/00* (2006.01)

(52) U.S. Cl.
CPC .............. *B60J 7/047* (2013.01); *B60J 7/0084* (2013.01)

(58) Field of Classification Search
CPC ............ B60J 7/0084; B60J 7/05; B60J 7/053; B60J 7/08; B60J 7/11; B60J 7/16
USPC .............. 296/210, 218, 215, 221, 222, 296/216.06–216.09, 213
See application file for complete search history.

(56) References Cited

U.S. PATENT DOCUMENTS

| 2,193,607 | A | * | 3/1940 | Votypka | 296/215 |
| 6,443,520 | B1 | * | 9/2002 | Schmaelzle et al. | 296/216.08 |
| 6,890,022 | B2 | * | 5/2005 | Doncov et al. | 296/213 |
| 6,942,286 | B2 | * | 9/2005 | Bohm et al. | 296/216.05 |
| 2006/0119142 | A1 | * | 6/2006 | Boehm et al. | 296/216.01 |

FOREIGN PATENT DOCUMENTS

EP  0938993 B1  8/2003

* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof construction is provided for a vehicle having a roof opening in a stationary roof part of the vehicle. The roof opening comprises forward and rearward roof opening edges which each extend transversely and two opposite, longitudinally extending roof opening side edges. At least at some of said roof opening side edges and forward and rearward roof opening edges have roof opening flanges extending substantially downwardly from the respective roof opening side edges and forward and rearward roof opening edges. A stationary roof panel permanently closes part of the roof opening, while a movable panel closes and opens a remainder of the roof opening. The stationary panel has panel edges extending along the roof opening side edges and along one of the forward and rearward roof opening edges and near to some of which downwardly extending panel brackets are provided which are attached to corresponding roof opening flanges.

22 Claims, 9 Drawing Sheets

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening in a stationary roof part of the vehicle, said roof opening comprising forward and rearward roof opening edges which each extend transversely and two opposite, longitudinally extending roof opening side edges, wherein at least at some of said roof opening side edges and forward and rearward roof opening edges roof opening flanges are provided extending substantially downwardly from the respective roof opening side edges and forward and rearward roof opening edges, the open roof construction further comprising a stationary roof panel adjacent said roof opening side edges and adjacent one of said forward and rearward roof opening edges and permanently closing part of the roof opening, and a movable panel for closing and opening the remainder of the roof opening, wherein further in regions near to and below the roof opening side edges longitudinally extending guides are provided and wherein moving mechanisms are provided configured to cooperate with said guides and with the movable panel for moving the movable panel between a closed position closing the remainder of the roof opening and an open position substantially below the stationary roof panel.

In such an open roof construction the stationary roof panel for example may comprise a glass panel which in a stationary manner is affixed to and (with an upper surface) extends in a coplanar manner with (an upper surface of) the stationary roof part. In its closed position the (upper surface of the) movable panel also generally will extend in a coplanar manner with the (upper surface of the) stationary roof part. The guides may be attached to the flanges or to another stationary part of the vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In one aspect of the invention the stationary roof panel has panel edges extending along the roof opening side edges and along one of the forward and rearward roof opening edges and near to some of which downwardly extending panel brackets are provided which are attached to corresponding roof opening flanges.

Thus the roof opening flanges now also are used for fixing the stationary roof panel and no additional members have to be provided therefor. This keeps the complexity and number of constructive members of the open roof construction at a minimum, while at the same time allowing to mount a stationary roof part in a simple yet nevertheless effective manner.

In one aspect of the invention at said roof opening side edges roof opening flanges are provided, wherein the stationary roof panel at its panel side edges extending along the roof opening side edges comprises downwardly extending panel brackets which are attached to the roof opening flanges. In such an embodiment the connection between the stationary roof and stationary panel occurs at the roof opening side edges.

In another aspect of the invention the panel brackets are attached to the roof opening flanges by mounting members, such as for example bolts or screws, and wherein said mounting members too are configured for attaching said guides to the roof opening flanges.

This allows a very quick and simple mounting process. But also dismounting (for example for maintenance or repairs) becomes very easy in such a manner.

In one aspect of the invention the panel brackets and roof opening flanges are provided with mounting holes for receiving the mounting members and wherein the mounting holes of at least one of the panel brackets and roof opening flanges are oversized for allowing an adjustment of the position of the mounting members.

Such an adjustment may be needed, for example, for compensating production tolerances or for compensating wear after prolonged use.

It is conceivable, then, that said mounting holes have a fully closed circumference. This prevents the assembled parts from becoming completely disengaged from each other when the mounting members have been loosened for allowing an adjustment.

As an alternative which allows to partly assemble parts of the construction (such as the mounting members) beforehand, said mounting holes may have an open side allowing a mounting member to be slid in from said open side.

The process of sliding the mounting members in from said open side may be improved when said mounting holes diverge from the open side inwardly, and for example are substantially V-shaped.

In one aspect of the invention it is sufficient when the mounting holes of the roof opening flanges are oversized; this, however, does not exclude the possibility that instead (or additionally) the mounting holes of the panel brackets are oversized.

It is possible that the panel brackets associated with the same panel side edge are interconnected for defining a single elongate panel bracket (which, thus, extends uninterrupted in the longitudinal direction) or that the panel brackets associated with the same panel side edge are separated from each other.

If a single (uninterrupted) panel bracket is provided, it may be shaped for defining an upwardly open water collecting and draining channel extending longitudinally below the interface between the roof opening side edge and corresponding panel side edge. Thus the panel bracket additionally performs the function of such a water collecting and draining channel, eliminating the need for a separate channel.

In a further aspect of the invention, between a cooperating panel side edge and roof opening side edge a seal is provided which has a downward prolongation defining an additional seal between the panel bracket and roof opening flange and which is shaped for defining an upwardly open water collecting and draining channel extending longitudinally below the interface between the roof opening side edge and corresponding panel side edge. This may be an alternative to the previous embodiment described above (although in theory it would also be possible to combine both solutions for assuring a very safe seal).

According to another aspect of the invention the panel brackets are attached to the roof opening flanges by mounting members and are undulated in the longitudinal direction for defining panel bracket parts between the mounting members with a spacing from the roof opening flange at least as large as the maximum dimension of the mounting member from said roof opening flange. When the movable panel moves underneath the stationary roof panel, its side edges (extending longitudinally) may move along the mounting members (for example heads of bolts projecting inwardly from the panel brackets) and may be damaged thereby (in most cases said side edges of the movable panel are provided with seals which are vulnerable and may rupture upon a contact with edges of such heads which are often rather sharp). By the provision of undulated panel brackets, the bracket parts between mounting members define guides for such side edges (or seals thereon) of the movable panel preventing a contact with the projecting parts of the mounting members.

In an alternative aspect of the invention the movable panel is provided with a surrounding seal for engaging the roof opening side edges in the closed position and wherein the dimensions of the roof opening flanges and of the panel brackets as well as the position of the mounting members are such that the seal of the movable panel is not at the same level as the mounting members when the movable panel is in its open position.

It is possible that the guides further are shaped to define water collecting and draining channels extending longitudinally below the interface between the roof opening side edges and corresponding panel side edges.

Although in many cases the guides will be attached directly to the roof opening flanges, it is conceivable too that each guide is attached to at least one auxiliary brace extending outwardly, away from the roof opening, from the roof opening flange. Such an embodiment, for example, may be used when the guide defines a water collecting and drainage channel which has to be positioned right below the interface between panel side edge and roof opening side edge.

Such an at least one auxiliary brace may have an inner part attached to the roof opening flange and extending substantially upward towards the stationary roof part, an intermediate part extending substantially horizontally and an outer part extending substantially inward again and having attached thereto the guide.

For improving the stability and strength of the construction a stiffening brace may be provided extending directly between the outer and inner parts of the auxiliary brace; the intermediate part of the auxiliary brace may directly, or indirectly through an additional part (for example a rubber part) engage the stationary roof part.

Finally, in yet another aspect of the invention the stationary panel near to its panel edge extending along the forward or rearward roof opening edge comprises at least one downwardly extending panel bracket which is attached to a corresponding roof opening flange provided at said forward or rearward roof opening edge. As a result the stationary panel will be attached to the stationary roof part at three of its sides (two side edges and the forward or rearward edge, depending on whether the stationary roof panel is positioned in the foremost or rearmost part of the roof opening).

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

Figure 1:
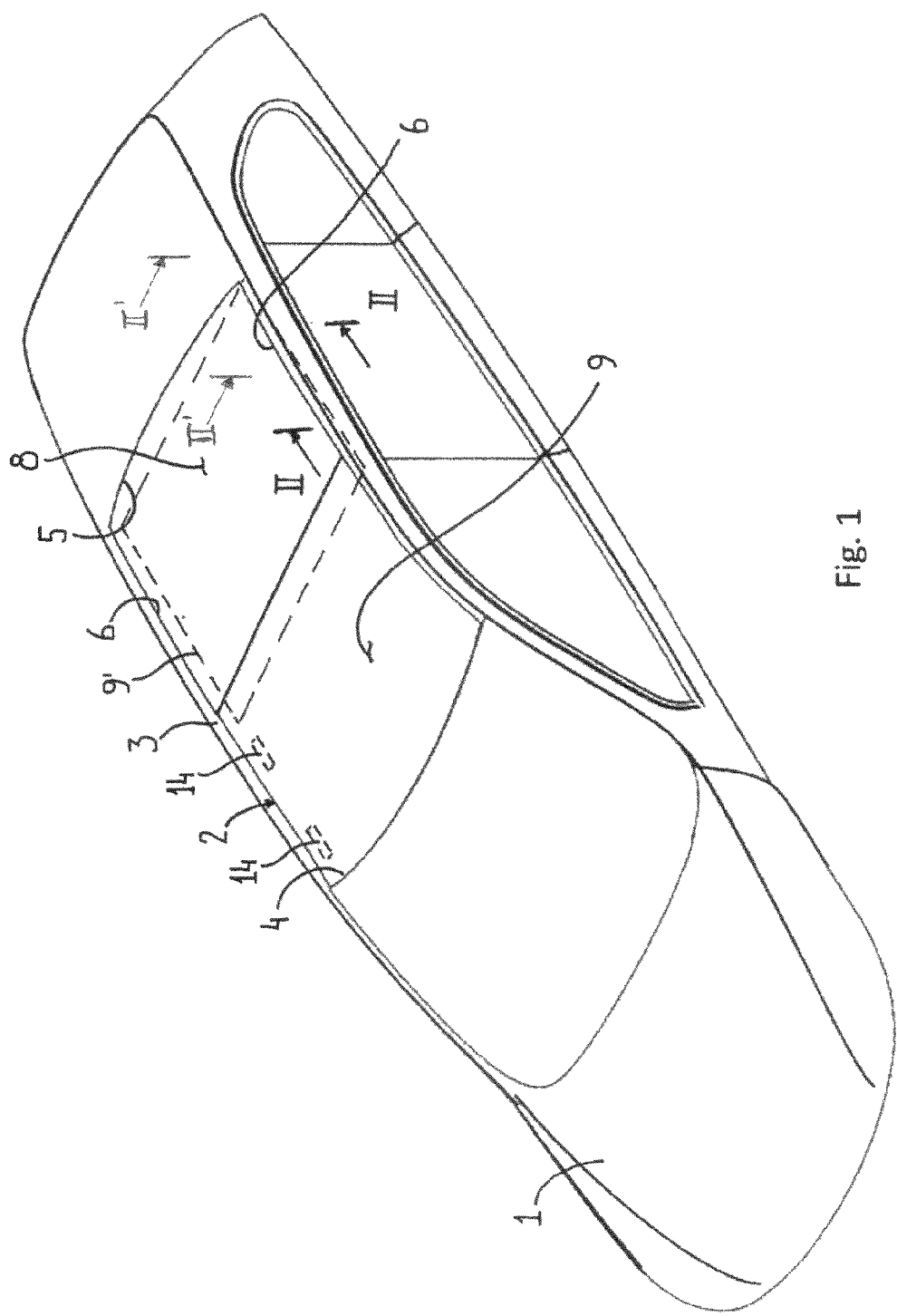
FIG. 1 shows an impression of a vehicle provided with an open roof construction.
Figure 2:
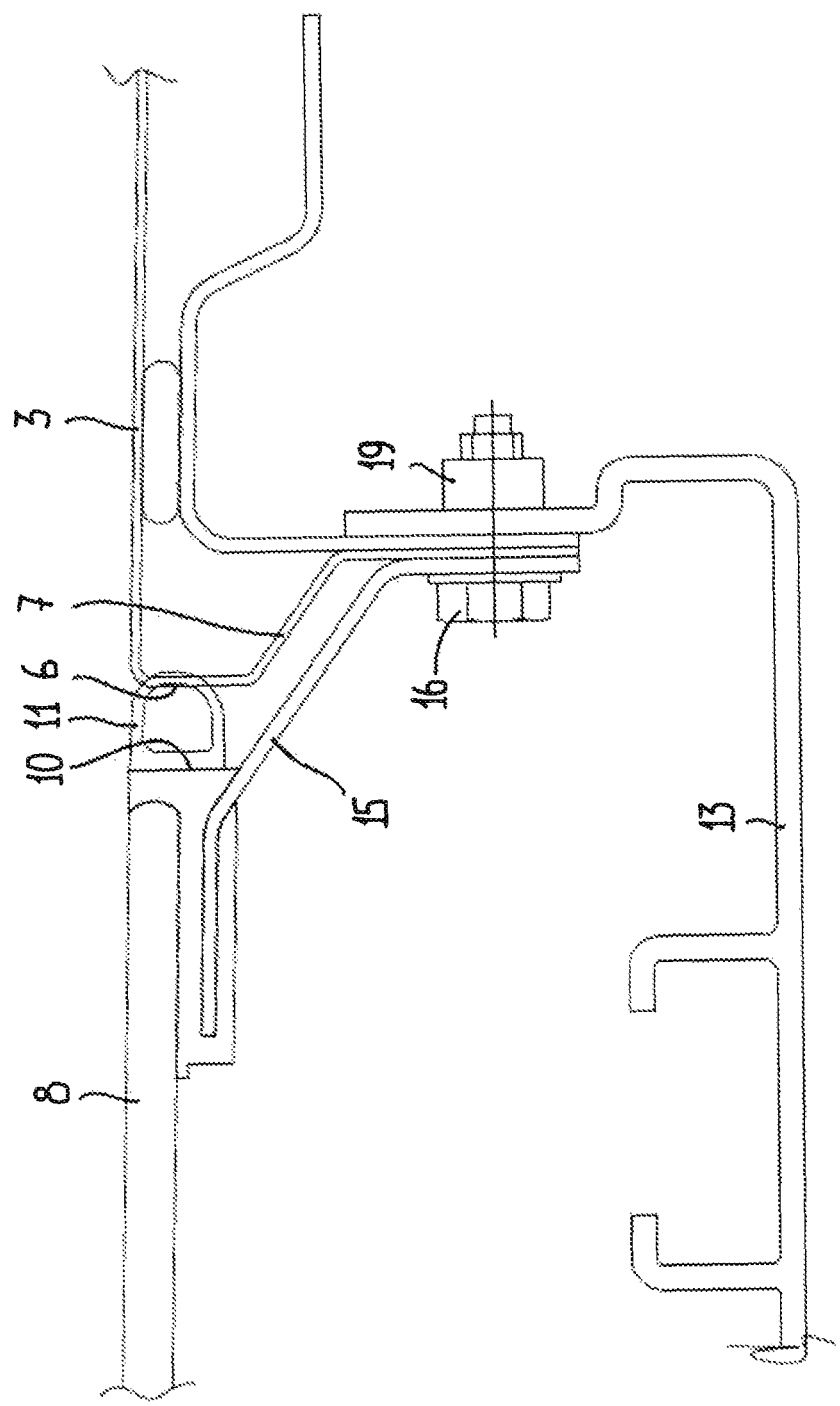
FIG. 2 shows a cross section according to II-II in FIG. 1 on a larger scale.

Firstly referring to FIGS. 1 and 2, part of a vehicle 1 is shown which is provided with an open roof construction according to aspects of the present invention. Said open roof construction comprises a roof opening 2 in a stationary roof part 3 of the vehicle 1. The roof opening 2 comprises a first transverse (forward) roof opening edge 4 and a second transverse (rearward) roof opening edge 5 which each extend transversely and two opposite, longitudinally extending roof opening side edges 6.

As appears clearly from FIG. 2, roof opening flanges 7 are provided at said roof opening side edges 6 extending substantially downwardly (and here also slightly inwardly) from the respective roof opening side edge 6. FIG. 2 is also representative for a situation in which flanges 7 are provided at the rearward or forward roof opening edge 5 or 4 (in correspondence with cross section according to II'-II' in FIG. 1).

The open roof construction further comprises a stationary roof panel 8 adjacent the rearward roof opening edge 5 and permanently closing a rearmost part of the roof opening 2, and a movable panel 9 for closing and opening the remaining foremost part of the roof opening 2. The stationary roof panel 8 may comprise a glass panel, which also may be the case for the movable panel 9. Panel side edges 10 of the stationary roof panel 8 are provided with seals 11 for at least engaging the corresponding edges 4,5 or 6 of the roof opening 2. Likewise the movable panel 9 may be provided with seals 12 (see FIG. 8).

In regions near to and below the roof opening side edges 6 longitudinally extending guides 13 are provided which are attached to said roof opening flanges 7, wherein further moving mechanisms 14 are provided (only schematically indicated at one side in FIG. 1) configured to cooperate with said guides 13 and with the movable panel 9 (in a manner known per se) for moving the movable panel 9 between a closed position closing the remainder of the roof opening 2 (as illustrated in full lines in FIG. 1) and an open position substantially below the stationary roof panel 8 (in FIG. 1 indicated schematically by broken lines 9').

FIG. 2 and in a corresponding manner FIGS. 4-9 are also representative of a situation in which the flange 7 is provided at a forward roof opening edge 4 or rearward roof opening edge 5.

Again referring to FIG. 2, near to the panel side edges 10 of the stationary roof panel 8 which extend along the roof opening side edges 6, downwardly extending panel brackets 15 are provided which are attached to said stationary roof panel 8 in any known matter (which is not relevant for the present invention) and to the roof opening flanges 7 by mounting members 16, such as for example bolts or screws. Said mounting members 16 too are configured for attaching said guides 13 to the roof opening flanges 7.

Figure 3:
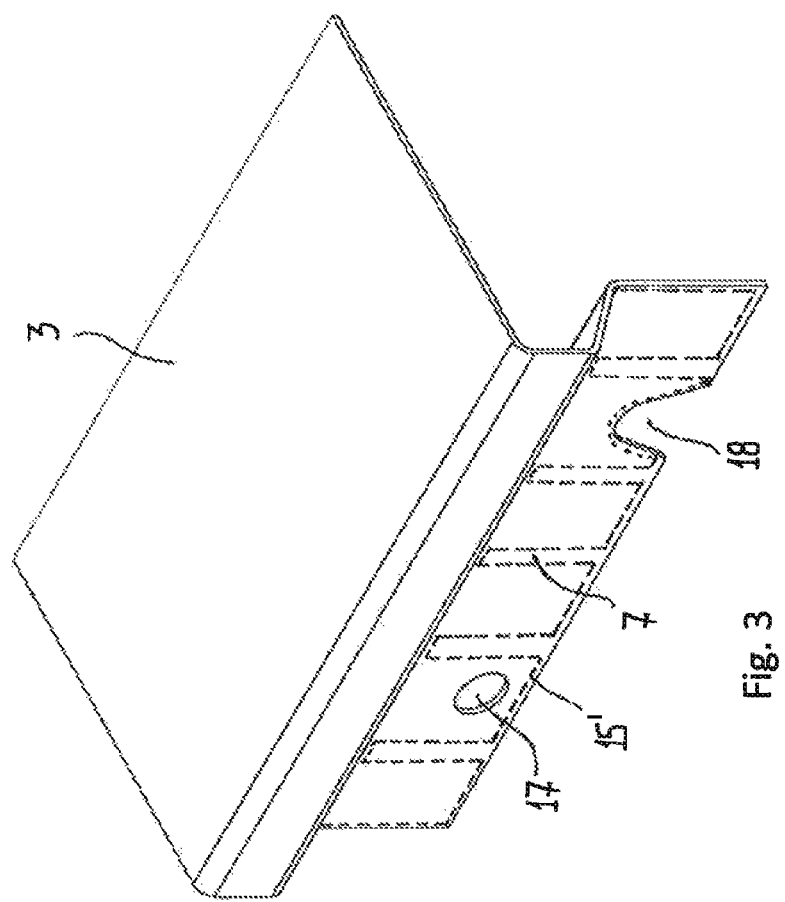
FIG. 3 shows two different embodiments of mounting holes.

For receiving the mounting members 16 the panel brackets 15 and roof opening flanges 7 are provided with mounting holes 17, 18 (only shown for the roof opening flanges 7 in FIG. 3). The mounting holes 17,18 of at least one of the panel brackets 15 and roof opening flanges 7 are oversized for allowing an adjustment of the position of the mounting members 16 and thus an adjustment of the position of the stationary roof panel 8 with respect to the stationary roof part 3.

FIG. 3 shows two embodiments of oversized mounting holes in the roof opening flanges 7. The mounting hole 17 has a fully closed circumference such that a mounting member 16, although loosened to allow an adjustment, cannot be lost. The mounting hole 18, however, has an open side (said mounting holes for example may diverge from the open side inwardly, and for example are substantially V-shaped) allowing a mounting member 16 to be slid in from said open side without the need for fully detaching the mounting member 16 (for example without the need for fully unscrewing a nut 19). This allows, for example, to already install the mounting members 16 onto the panel brackets 15 and next to slide the stationary roof panel 8 into its place while guiding the shafts of the mounting members 16 into the open mounting holes 18.

As shown in broken lines in FIG. 3, a succession of panel bracket parts 15' are shown in a position for cooperating with the roof opening flange 7.

Along the longitudinal extension of the roof opening flanges 7 generally a number of mounting members 16 will be provided. For each mounting member 16 the stationary roof panel 8 may comprise a separate panel bracket 15, but it is also conceivable that the panel brackets 15 associated with the same panel side edge 10 are interconnected for defining a single elongate panel bracket.

Figure 4:
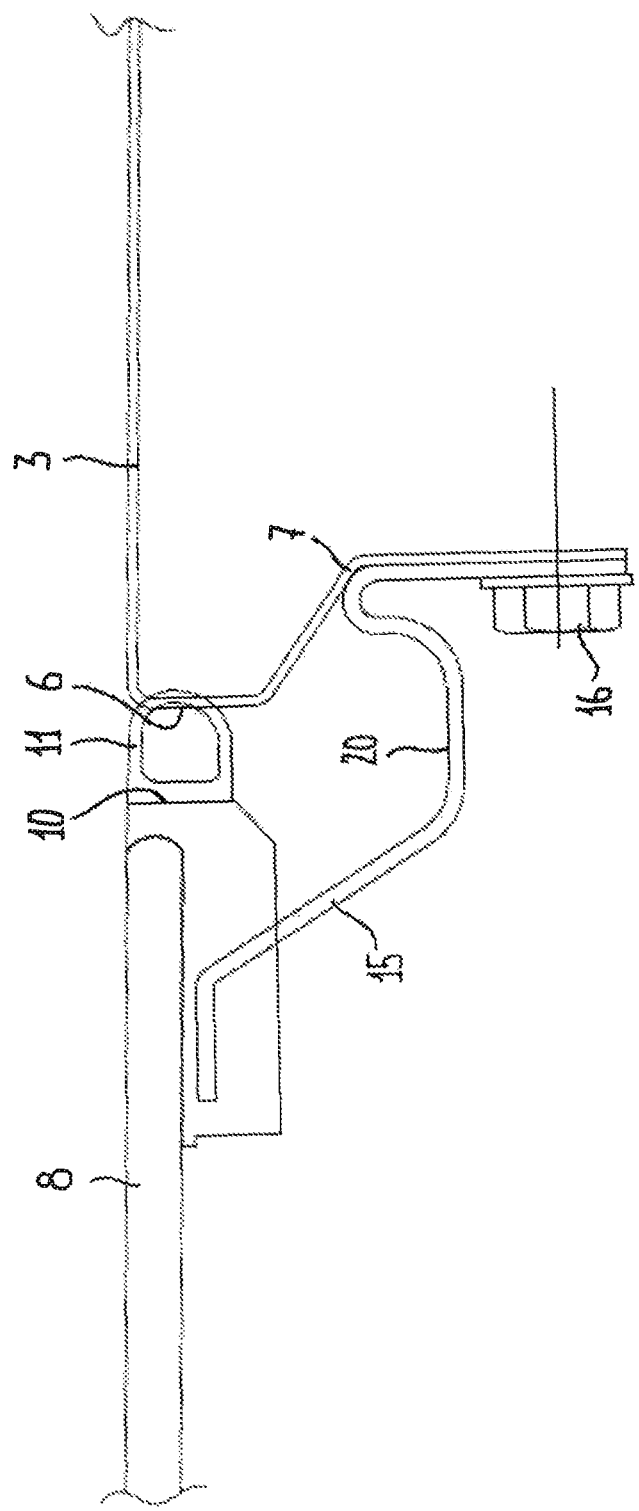
FIGS. 4-6 show cross sections corresponding to FIG. 2, but of different embodiments.

FIG. 4 shows an embodiment in which indeed such a single elongate panel bracket 15 is provided at each longitudinal panel side edge 10. This single elongate panel bracket 15 is shaped for defining an upwardly open water collecting and draining channel 20 extending longitudinally below the interface between the roof opening side edge 6 and corresponding panel side edge 10.

Figure 5:
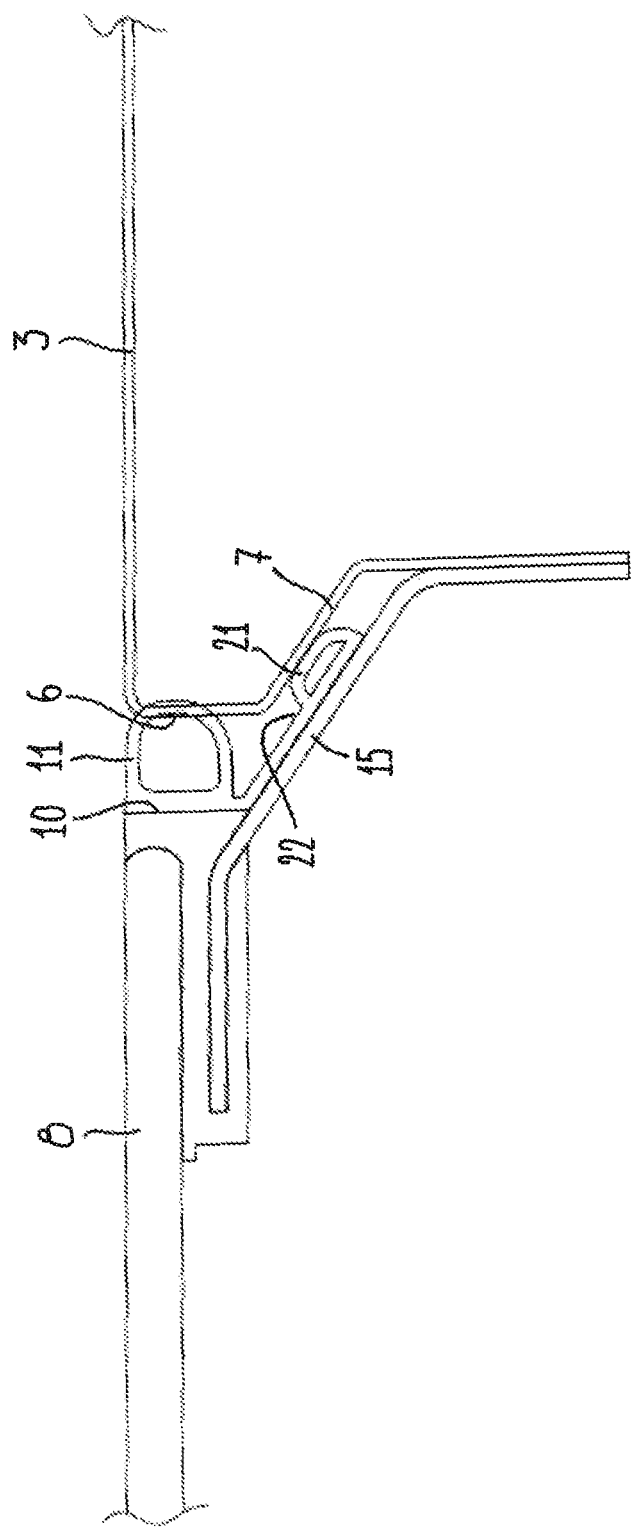

In FIG. 5 an alternative embodiment has been illustrated in which between a cooperating panel side edge 10 and roof opening side edge 6 a seal 11 is provided which has a downward prolongation 21 defining an additional seal between the panel bracket 15 and roof opening flange 7 and which further is shaped for defining an upwardly open water collecting and draining channel 22 extending longitudinally below the interface between the roof opening side edge 6 and corresponding panel side edge 10. Of course such a seal configuration also may be combined with a panel bracket 15 shaped in accordance with FIG. 4, creating a fail-safe seal arrangement.

Figure 6:
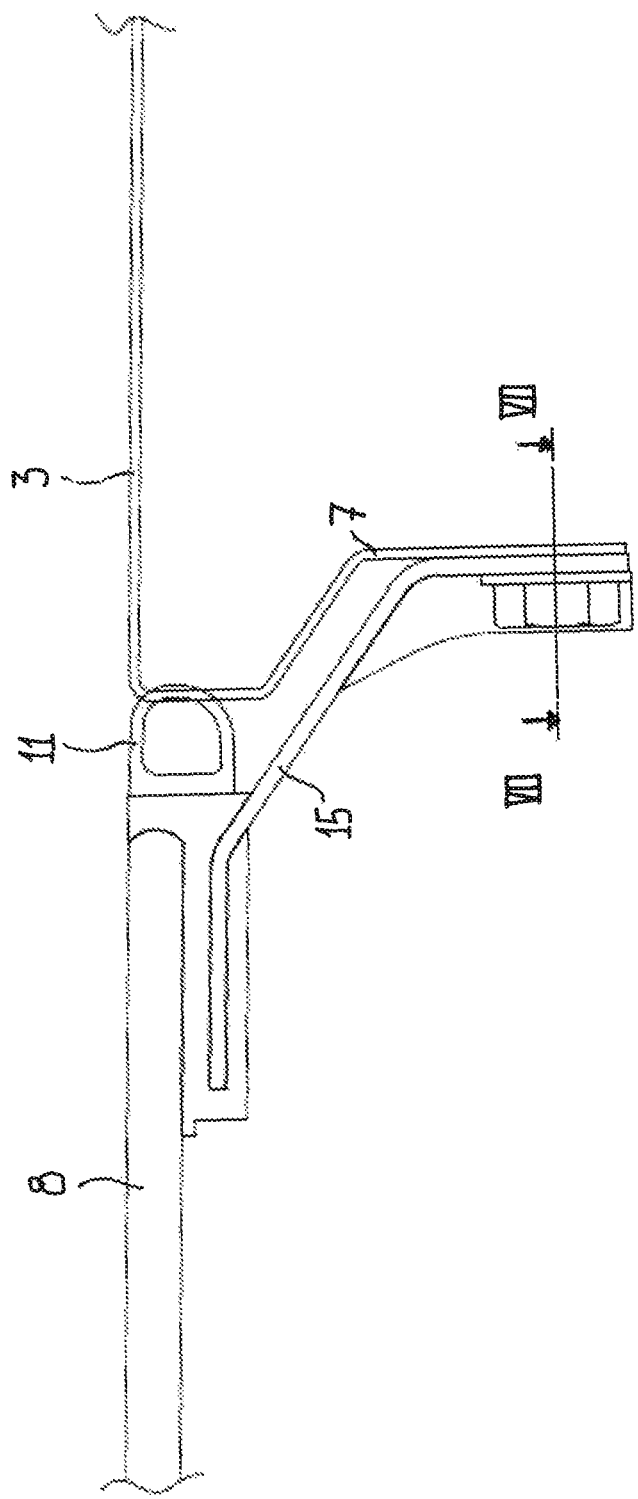
Figure 7:
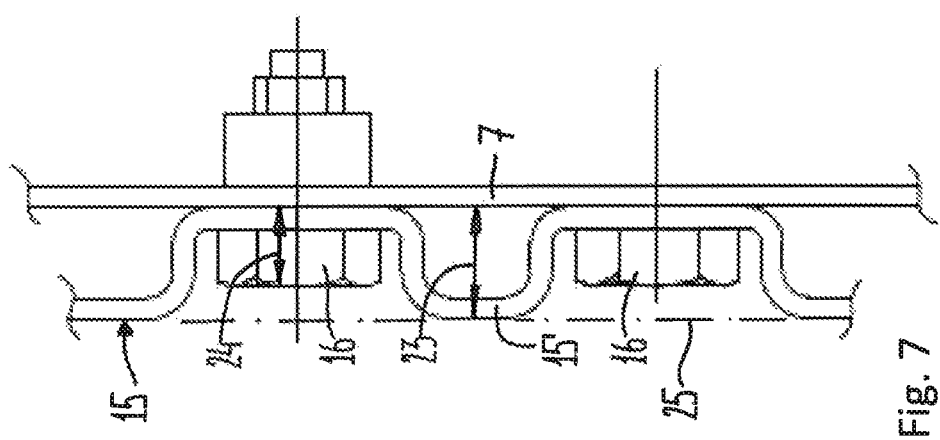
FIG. 7 shows a cross section according to VII-VII in FIG. 6.

In FIGS. 6 and 7 the panel brackets also are combined into single elongate panel brackets 15 at both panel side edges 10 of the stationary roof panel 8 which are attached to the roof opening flanges 7 by mounting members 16. The brackets 15 are undulated in the longitudinal direction for defining panel bracket parts 15' between the mounting members 16 with a spacing 23 from the roof opening flange 7 at least as large as the maximum dimension 24 of the mounting member 16 from said roof opening flange 7. As a result those panel bracket parts 15' may act as guide surfaces (defining a guide path 25) for guiding longitudinal side edges of the movable panel 9 (or seals 12 provided thereon) when the movable panel 9 moves underneath the stationary roof panel 8. Thus these side edges or seals will not be engaged in a detrimental manner by the mounting members 16.

Figure 8:
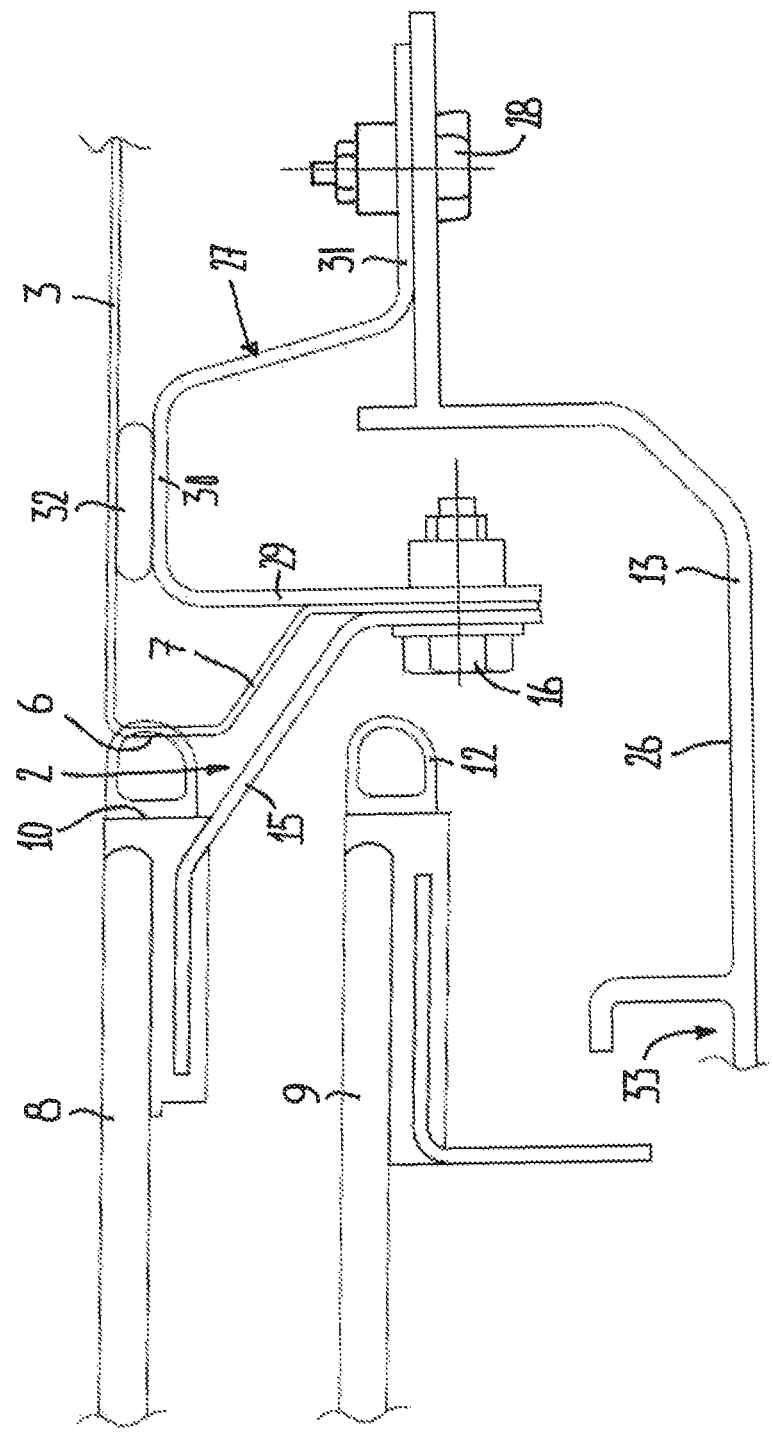
FIGS. 8 and 9 show cross sections corresponding to FIG. 2, but of different embodiments.

Another way for achieving such a result has been illustrated in FIG. 8. In this embodiment the movable panel 9 is provided with a surrounding seal 12 for engaging the corresponding roof opening edges 4,6 (and the forward edge of the stationary roof panel 8) in the closed position. The dimensions of the roof opening flanges 7 and of the panel brackets 15 as well as the position of the mounting members 16 (and holes therefor) are such that the seal 12 of the movable panel 9 is not at the same level as the mounting members 16 (in this particular case above the mounting members 16) when the movable panel 9 is in its open position below the stationary roof panel 8. Now the panel brackets 15 need not to be undulated.

FIG. 8 further shows that the guides 13 are shaped to define water collecting and draining channels 26 extending longitudinally below the interface between the roof opening side edges 6 and corresponding panel side edges 10. Again, such channels 26 may be combined with any of the channels 20 or 22 mentioned before.

In this embodiment each guide 13 by means of additional mounting members 28 is attached to at least one auxiliary brace 27 (a succession thereof or a single, combined one) extending outwardly, away from the roof opening 2, from the roof opening flange 7. In the illustrated embodiment the at least one auxiliary brace 27 has an inner part 29 attached to the roof opening flange 7 by the mounting members 16 and extending substantially upward towards the stationary roof part 3, an intermediate part 30 extending substantially horizontally and an outer part 31 extending substantially inward again and having attached thereto the guide 13 by means of the additional mounting members 28. The intermediate part 30 of the auxiliary brace 15 indirectly engages the stationary roof part 3 through an additional part 32, for example made of rubber. But also a direct engagement is possible, for example when the intermediate part 30 is attached to the stationary roof part 3 by welding, riveting or other ways. This adds to the stability of the construction.

Figure 9:
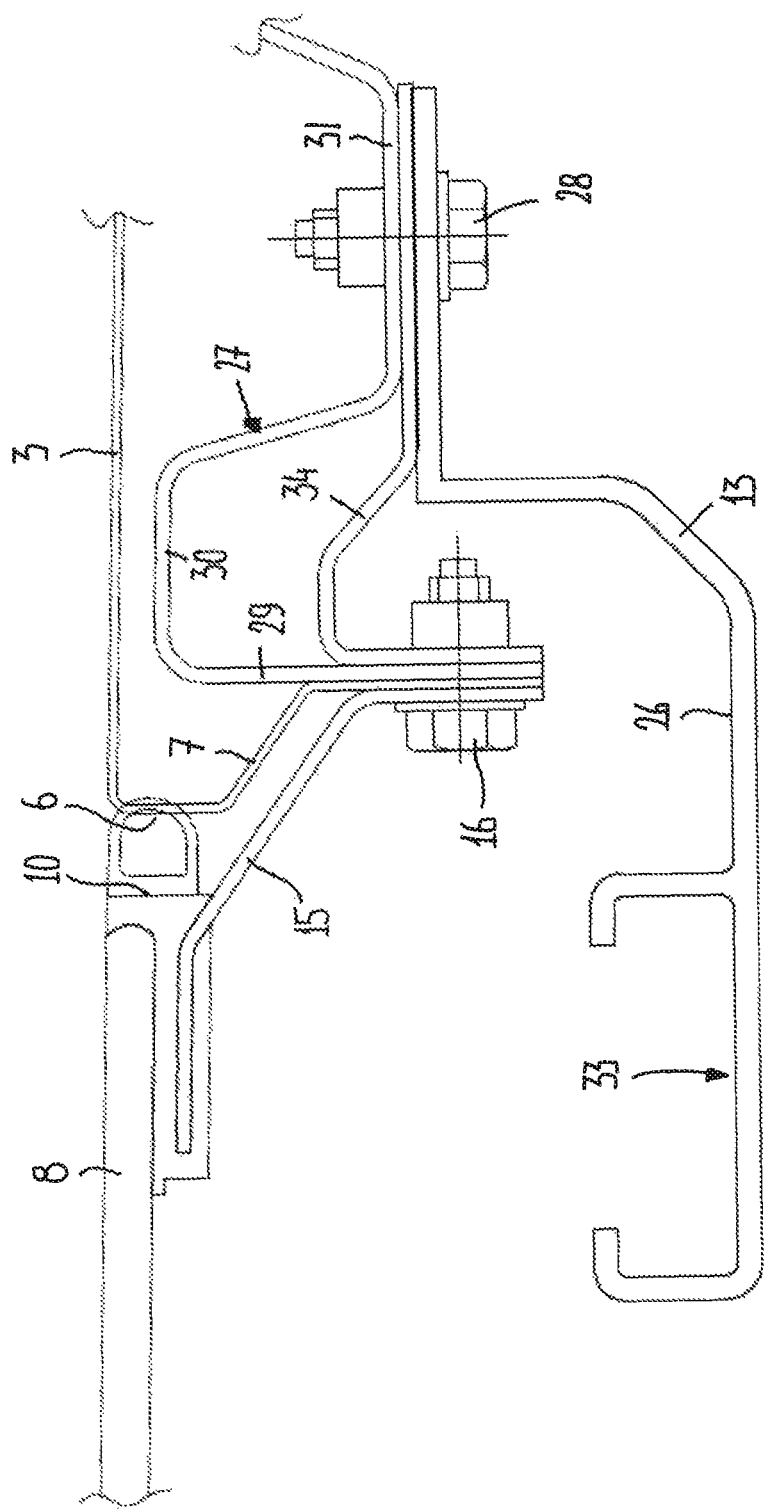

Finally, FIG. 9 shows an embodiment quite similar to the embodiment of FIG. 8, but now the intermediate part 30 of the auxiliary brace 27 does not engage the stationary roof part 3. Instead a stiffening brace 34 is provided extending directly between the outer and inner parts 29,31 of the auxiliary brace 27 and connected to the mounting members 16 and additional mounting members 28. Further it appears that the outer part 31 may be prolonged (for example to be attached to a stationary part of the vehicle 1).

FIGS. 8 and 9 further illustrate guide channels 33 which in a manner known per se may cooperate with the moving mechanisms 14 and which also may house drive cables for such mechanisms.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle, comprising:
 a stationary roof part of the vehicle having a roof opening, said roof opening comprising first and second transverse roof opening edges which each extend transversely and two opposite, longitudinally extending roof opening side edges arranged parallel to forward movement of the vehicle, wherein at least at some of said roof opening side edges and first and second transverse roof opening edges, roof opening flanges are provided extending substantially downwardly from the respective roof opening side edges and the first and second transverse roof opening edges;
 a stationary roof panel adjacent said roof opening side edges and adjacent one of said first and second transverse roof opening edges and permanently closing part of the roof opening, wherein the stationary roof panel has panel edges extending along the roof opening side edges and along one of the first and second transverse roof opening edges and near to some of which panel brackets are provided inclining downwardly from the stationary panel to a lower end which is attached to corresponding said roof opening flanges; and a movable panel configured to close and open a remainder of the roof opening;

longitudinally extending guides provided in regions near to and below the roof opening side edges, wherein said guides are attached to the roof opening flanges;

moving mechanisms configured to cooperate with said guides and with the movable panel to move the movable panel between a closed position closing the remainder of the roof opening and an open position substantially below the stationary roof panel.

2. The open roof construction according to claim 1, wherein at said roof opening side edges the roof opening flanges are provided, wherein panel side edges of the stationary roof panel extending along the roof opening side edges comprise downwardly extending panel brackets which are attached to the roof opening flanges.

3. The open roof construction according to claim 1, wherein the panel brackets are attached to the roof opening flanges by mounting members, said mounting members configured to attach said guides to the roof opening flanges.

4. The open roof construction according to claim 3, wherein the panel brackets and roof opening flanges are provided with mounting holes configured to receive the mounting members and wherein the mounting holes of at least one of the panel brackets and roof opening flanges are configured as oversized to allow an adjustment of a position of the mounting members.

5. The open roof construction according to claim 4, wherein said mounting holes have a fully closed circumference.

6. The open roof construction according to claim 4, wherein said mounting holes have an open side configured to allow a mounting member to be slid in from said open side.

7. The open roof construction according to claim 6, wherein said mounting holes converge from the open side inwardly.

8. The open roof construction according to claim 4, wherein the mounting holes of the roof opening flanges are oversized.

9. The open roof construction according to claim 1, wherein the panel brackets associated with the same panel side edge are interconnected to define a single elongate panel bracket.

10. The open roof construction according to claim 1, wherein the panel brackets associated with the same panel side edge are separated from each other.

11. The open roof construction according to claim 9, wherein the single elongate panel bracket is shaped to define an upwardly open water collecting and draining channel extending longitudinally below the interface between the roof opening side edge and corresponding panel side edge.

12. The open roof construction according to claim 1, wherein between a cooperating panel side edge and roof opening side edge a seal is provided which has a downward prolongation defining an additional seal between the panel bracket and roof opening flange and which is shaped to define an upwardly open water collecting and draining channel extending longitudinally below the interface between the roof opening side edge and corresponding panel side edge.

13. The open roof construction according to claim 9, wherein the panel brackets are attached to the roof opening flanges by mounting members and are undulated in the longitudinal direction so as to define panel bracket parts between the mounting members with a spacing from the roof opening flange at least as large as a maximum dimension of the mounting member from said roof opening flange.

14. The open roof construction according to claim 3, wherein the movable panel is provided with a surrounding seal configured to engage the roof opening side edges in the closed position and wherein the dimensions of the roof opening flanges and of the panel brackets as well as the position of the mounting members are such that the seal of the movable panel is not at the same level as the mounting members when the movable panel is in the open position.

15. The open roof construction according to claim 1, wherein the guides further are shaped to define water collecting and draining channels extending longitudinally below the interface between the roof opening side edges and corresponding panel side edges.

16. The open roof construction according to claim 1, wherein each guide is attached to at least one auxiliary brace extending outwardly, away from the roof opening, from the roof opening flange.

17. The open roof construction according to claim 16, wherein the at least one auxiliary brace has an inner part attached to the roof opening flange and extending substantially upward towards the stationary roof part, an intermediate part extending substantially horizontally and an outer part extending substantially downward again and having attached thereto the guide.

18. The open roof construction according to claim 17, wherein a stiffening brace is provided extending directly between the outer and inner parts of the auxiliary brace.

19. The open roof construction according to claim 17, wherein the intermediate part of the auxiliary brace directly, or indirectly through an additional part, engages the stationary roof part.

20. The open roof construction according to claim 1, wherein the stationary panel near to its panel edge extending along the first transverse roof opening edge comprises at least one downwardly extending panel bracket which is attached to a corresponding roof opening flange provided at said first transverse roof opening edge.

21. The open roof construction according to claim 1, wherein the stationary panel near to its panel edge extending along the second transverse roof opening edge comprises at least one downwardly extending panel bracket which is attached to a corresponding roof opening flange provided at said second transverse roof opening edge.

22. An open roof construction for a vehicle, comprising:
a stationary roof part of the vehicle having a roof opening, said roof opening comprising first and second transverse roof opening edges which each extend transversely and two opposite, longitudinally extending roof opening side edges arranged parallel to forward movement of the vehicle, wherein at least at some of said roof opening side edges and first and second transverse roof opening edges, roof opening flanges are connected directly to and extend substantially downwardly from the respective roof opening side edges and first and second transverse roof opening edges at the respective roof opening side edges and first and second transverse roof opening edges;

a stationary roof panel adjacent said roof opening side edges and adjacent one of said first and second transverse roof opening edges and permanently closing part of the roof opening, wherein the stationary roof panel has panel edges extending along the roof opening side edges and along one of the first and second transverse roof opening edges and near to some of which panel brackets are provided inclining downwardly from the stationary panel to a lower end which is attached to said corresponding roof opening flanges;

a movable panel configured to close and open the remainder of the roof opening;

longitudinally extending guides provided in regions near to and below the roof opening side edges, wherein said guides are attached to the roof opening flanges; and moving mechanisms configured to cooperate with said guides and with the movable panel to move the movable panel between a closed position closing the remainder of the roof opening and an open position substantially below the stationary roof panel.

\* \* \* \* \*